United States Patent
Li et al.

(10) Patent No.: US 8,227,135 B2
(45) Date of Patent: Jul. 24, 2012

(54) ELECTROLYTES TO ENHANCE OXYGEN REDUCTION REACTION (ORR) IN THE CATHODE LAYER OF PEM FUEL CELL

(75) Inventors: Wen Li, Ann Arbor, MI (US); John Muldoon, Saline, MI (US); Hiroshi Hamaguchi, Aichi (JP); Akira Tsujiko, Tokyo (JP); Toshiya Saito, Aichi (JP); Ryszard J. Wycisk, Cleveland, OH (US); Jun Lin, Beachwood, OH (US); Peter N. Pintauro, Shaker Heights, OH (US)

(73) Assignees: Toyota Motor Corporation, Toyota (JP); Toyota Motor Engineering & Manufacturing North America, Inc., Erlanger, KY (US); Case Western Reserve University, Cleveland, OH (US)

( * ) Notice: Subject to any disclaimer, the term of this patent is extended or adjusted under 35 U.S.C. 154(b) by 1574 days.

(21) Appl. No.: 11/391,592

(22) Filed: Mar. 28, 2006

(65) Prior Publication Data
US 2007/0015040 A1    Jan. 18, 2007

Related U.S. Application Data

(60) Provisional application No. 60/666,276, filed on Mar. 29, 2005.

(51) Int. Cl.
*H01M 4/86* (2006.01)

(52) U.S. Cl. ........ 429/483; 429/490

(58) Field of Classification Search .......... 429/483, 429/490, 506, 530
See application file for complete search history.

(56) References Cited

U.S. PATENT DOCUMENTS

| | | | |
|---|---|---|---|
| 5,176,969 A * | 1/1993 | Miyabayashi et al. | 429/212 |
| 6,110,236 A | 8/2000 | Tsang et al. | |
| 6,365,294 B1 | 4/2002 | Pintauro et al. | |
| 6,946,211 B1 * | 9/2005 | Bjerrum et al. | 429/33 |
| 2004/0225153 A1 | 11/2004 | Allcock et al. | |

FOREIGN PATENT DOCUMENTS

| | | | |
|---|---|---|---|
| JP | 409092331 A * | 4/1997 | |
| WO | WO-0072395 | 11/2000 | |

OTHER PUBLICATIONS

R. Wycisk, J.K. Lee, and P.N. Pintauro. "Sulfonated Polyphosphazene-Polybenzimidazole Membranes for Direct Methanol Fuel Cells." *Journal of Electrochemical Society*, vol. 152, A892-A898 (2005).

(Continued)

*Primary Examiner* — Jennifer Michener
*Assistant Examiner* — Monique Wills
(74) *Attorney, Agent, or Firm* — Gifford, Krass, Sprinkle, Anderson & Citkowski, P.C.

(57) ABSTRACT

Improved polymer-based materials are described, for example for use as an electrode binder in a fuel cell. A fuel cell according to an example of the present invention comprises a first electrode including a catalyst and an electrode binder, a second electrode, and an electrolyte located between the first electrode and the second electrode. The electrolyte may be a proton-exchange membrane (PEM). The electrode binder includes one or more polymers, such as a polyphosphazene.

15 Claims, 4 Drawing Sheets

OTHER PUBLICATIONS

C.J. Orne, J.R. Klaehn, F.R. Stewart. "Gas permeability and ideal selectivity of poly[bid-(phenoxy)-phosphzene], poly[bis-(4-*tert*-butylphenoxy)phosphazene], and poly[bis-(3,5-di-*tert*-butylphenoxy)$_{1.2}$(chloro)$_{0.8}$phosphazener]" *Journal of Membrane Science*, vol. 238, 47-55 (2004).

M.A. Hickner, H. Ghassemi, Y.S. Kim, B.R. Einsla, and J.E. McGrath. "Alternative Polymer Systems for Proton Exchange Membranes (PEMs)" *Chemical Review* 2004, vol. 104, p. 4587-4612.

J. Roziere and D.J. Jones. "Non-fluorinated polymer materials for proton exchange membrane fuel cells." *Annual Review of Materials Research*, Aug. 2003, vol. 33, p. 503-555.

\* cited by examiner

ELECTROLYTES TO ENHANCE OXYGEN REDUCTION REACTION (ORR) IN THE CATHODE LAYER OF PEM FUEL CELL

REFERENCE TO RELATED APPLICATION

This application claims priority from U.S. Provisional Application Ser. No. 60/666,276, filed Mar. 29, 2005, the entire content of which is incorporated herein by reference.

FIELD OF THE INVENTION

The invention relates to oxygen permeable materials, in particular to oxygen permeable polymers and fuel cells using such materials.

BACKGROUND OF THE INVENTION

Fuel cells are attracting great attention due to their high energy conversion efficiency and low pollution emission, relative to conventional combustion engines. Proton-exchange membrane fuel cells (PEM-FCs) are promising power generators for portable, stationary, and automotive applications. A PEM-FC includes a membrane-electrode-assembly (MEA), composed of a cation (proton) exchange membrane with catalyst powder electrodes attached to the opposing membranes surfaces. The electrodes include catalyst particles and an electrode binder. A proton exchange membrane is also sometimes referred to as a polymer electrolyte membrane.

Oxygen permeation through the cathode layer of the MEA is important for fuel cell operation. Oxygen molecules need to permeate through the electrolyte layer to the surface of the catalyst, where the oxygen molecules are activated by the cathode catalyst to react with protons and electrons to form water through the oxygen reduction reaction (ORR). The rate of oxygen permeation through the cathode is apparently the control step of the ORR, so that increased oxygen permeation increases the activation rate of the ORR, directly increasing PEM-FC performance.

For hydrogen/air and direct methanol fuel cells, a typical electrode binder is a perfluorosulfonic acid polymer such as Nafion™ (DuPont). Nafion™ is attractive as a binder because it possesses a number of desirable properties, including chemical stability, mechanical stability, high proton conductivity, and high gas permeability to oxygen (air) and hydrogen. Unfortunately, Nafion™ is an expensive material due to its complicated manufacturing procedure. Also, there is a serious environmental issue of HF release upon its decomposition under FC operating conditions, which would be avoided using a non-fluorinated polymer. These problems, and others, have impeded the commercialization of PEM-FCs. Hence, much effort has been devoted to the development of a cheap non-fluorinated membrane for the application in PEM-FC. See J. Rozière and D. J. Jones, "Non-fluorinated Polymers Materials for Proton Exchange Membrane Fuel Cells", *Annu. Rev. Mater. Res.*, 33, 503-503 (2003); M. A. Hickner et al., "Alternative Polymer Systems for Proton Exchange Membranes", *Chem. Rev.*, 104, 4587-4612(2004). Although there has been significant research into new proton-exchange membrane materials for PEM fuel cells, there has been little research into finding alternatives to Nafion™ for the electrode binder.

SUMMARY OF THE INVENTION

Embodiments of the present invention relate to fuel cells, such as proton-exchange membrane fuel cells (PEM-FCs).

Some embodiments of the present invention include improved electrode binders for use in catalyst powder electrodes within a fuel cell. Electrode binders may include polymers having improved gas transport properties, and good chemical and mechanical stability. Furthermore, an electrode binder material may include acidic functional groups that impart proton conductivity to the material.

A fuel cell according to an embodiment of the present invention comprises: a first electrode including a catalyst, an electron conducting material (such as graphite), and an electrode binder; a second electrode; and an electrolyte located between the first electrode and the second electrode. The electrolyte may be a proton-exchange membrane (PEM). The electrode binder includes a polymer such as a polyphosphazene. In particular embodiments, the first electrode is a cathode or positive electrode of the fuel cell, so that the electrode binder can also be referred to as a cathode binder, the second electrode being the anode or negative electrode. An electrode, for example the cathode of a fuel cell, according to an embodiment of the present invention includes a dispersed catalyst and a binder, the binder including one or more polymers having sidechain groups chosen so as to enhance gas permeability and/or proton conductivity.

A representative polymer according to the present invention includes a polymer backbone, a first sidechain, and a second sidechain. The polymer backbone may be any polymer chain, including organic and inorganic chains. A preferred example is a polyphosphazene backbone. The first sidechain includes an aromatic group, the aromatic group being substituted with a small substituent group to inhibit pi-stacking. The small substituent group may be a group having 0-5 carbon atoms, more preferably 0-2 carbon atoms. The small substituent group may be an alkyl group (the term here including fluoroalkyl groups), such as a methyl or a ethyl group, or a substituent atom such as —F. A preferred example is an ethyl group. The aromatic group may comprise a single aromatic ring, such as a phenyl group or nitrogen-containing heterocycle such as tetrazole, or a multiple ring structure such as a fused ring structure. There may be additional substituent groups, including acid groups. The second sidechain includes an acid group, such as a sulfoxy group. The second sidechain may further include an aromatic ring, which may have a small substituent group so as to inhibit pi-stacking. The first and second sidechains may be the same, but preferably they are different so as to inhibit polymer crystallization.

Example polymers, useful as an electrode binder, include polyphosphazenes, such as polyphosphazenes having an acid group, such as a sulfonated polyphosphazene. A representative example is sulfonated poly[(4-ethylphenoxy)(phenoxy)phosphazene]. The acid groups may also be a phosphonic acid group, a sulfonamide acid group, or some combination of acid groups may be present. The polyphosphazene sidechains may comprise alkoxy or aryloxy groups. Example polymers also include cross-linked polymers, such as cross-linked polyphosphazene.

An electrode binder according to the present invention comprises a blend of a first polymer and at least one other component, such as a second polymer. The at least one other component may be selected to reduce the glass transition temperature below the operating temperature of the fuel cell, enhance proton conductivity, enhance electron conductivity, or some combination of these or other effects. For example, an improved binder includes a polyphosphazene and at least one other polymer, such as a polybenzimidazole, which reduces the glass transition temperature of the binder. An electrode binder may also comprise a blend of a first polyphosphazene and a second polyphosphazene.

Fuel cells according to embodiments of the present invention include a fuel cell operating with a hydrogen-containing fuel (such as hydrogen or methanol) and an oxygen-containing oxidant (such as oxygen or atmospheric air). A representative fuel cell, comprises a first electrode comprising a catalyst, an electron conducting material, and an electrode binder, the electrode binder comprising a polyphosphazene; a second electrode; and a proton-exchange membrane, located between the first electrode and the second electrode. The first electrode, second electrode, and proton-exchange membrane (PEM) may form a membrane electrode assembly used in the fuel cell. The electrode binder preferably has a glass transition temperature less than the operating temperature range of the fuel cell. The PEM may include any proton-conducting polymer, such as a perfluorosulfonic acid polymer such as Nafion™, and may comprises a proton-conducting polyphosphazene, such as a polyphosphazene having acid groups attached to the sidechain. The electrode binder may include a polymer having sidechains including aromatic groups and/or acid groups, such as a sulfonated poly[(bisphenoxy)phosphazene].

Embodiments of the invention relate to the use of polymers in the membrane-electrode-assembly components of a PEM fuel cell. Polymer-based electrode binders may include one or more polyphosphazenes having alkyl and/or aryl sidechains. Some or all polymer sidechains may be functionalized with an acid group (e.g., a sulfonic acid group). Polymers may also have crosslinkable sidechain, and improved binder materials include crosslinked polymers.

DETAILED DESCRIPTION OF THE INVENTION

Figure 1:
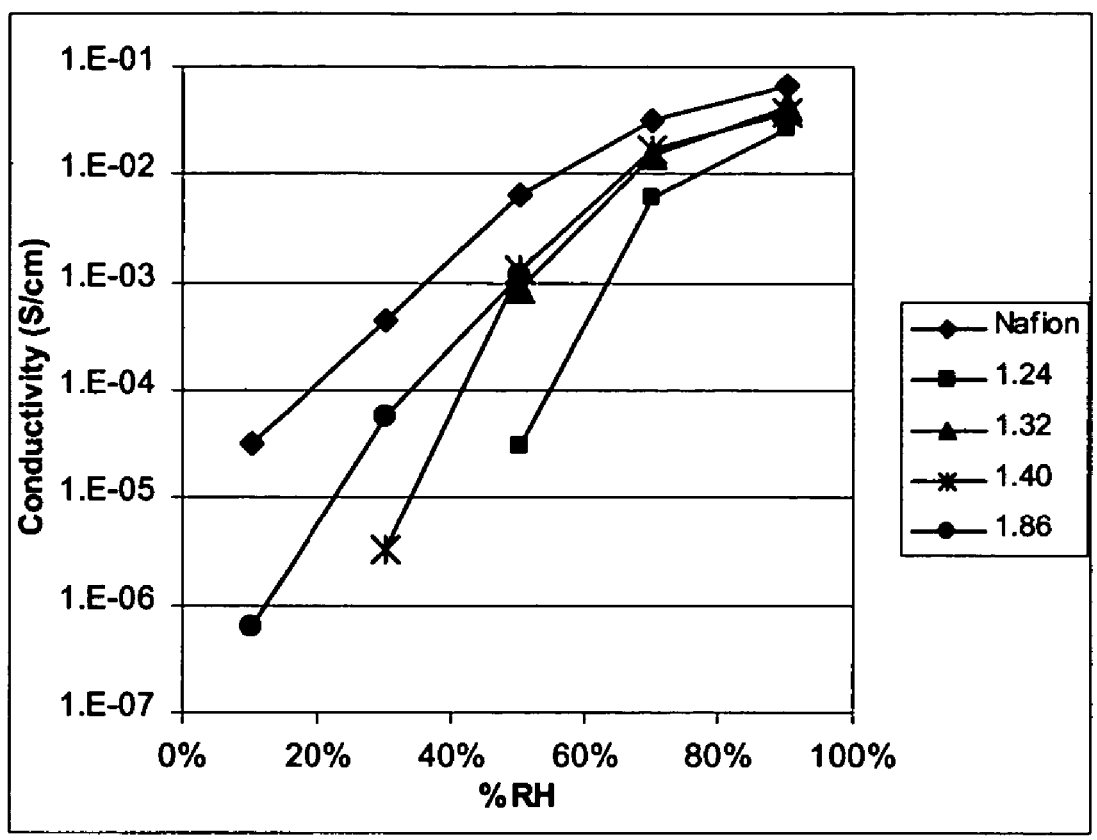
FIG. 1 shows proton conductivity for SBPP samples at 60° C.

In a fuel cell, hydrogen is split into protons and electrons at the anode (negative electrode), and the protons are transported through the electrolyte (such as a proton-exchange membrane) to the cathode (positive electrode). An electrode binder that is a good proton conductor is useful for transporting protons through the electrode to the catalyst. Hence, an electrode binder that has both good proton conductivity and oxygen permeability is desirable.

Fuel cell performance increases with an increase in oxygen concentration at the cathode catalyst. A cathode binder with improved oxygen permeability can appreciably enhance fuel cell performance. Embodiments of the present invention include electrode binders having proton conductivity, thermal and oxidative stability and good oxygen permeability.

The oxygen permeability of the electrode binder can be increased using polymers having a high free volume and a low glass transition temperature. The glass transition temperature of the electrode binder is preferably lower than the operating temperature of a fuel cell in which it is used.

Example electrode binders include polymers having sidechain groups that inhibit efficient chain packing and, therefore, increase the oxygen permeability. Sidechain groups may include, for example, bulky organic groups that disrupt π-system interactions. The addition of small substituents, such as —$CF_3$, —$CH_3$, —F, —$CF_2H$, -Et, and the like, to aromatic rings within a polymer sidechain may further disturb molecular organization, increasing the free volume and oxygen permeability. Another approach is to promote molecular motion of the polymer, particularly of the sidechains, by introducing structural asymmetry through the addition of small substituents in the ortho and meta position on aromatic rings within a sidechain. Increased molecular motion enhances gas transport in the polymer. Such small substituents may have 0-5 carbon atoms, and preferably 0-2 carbon atoms.

Polyphosphazenes have an inorganic polymer backbone, —$[P=N]_n$—, that is chemically stable, oxidative stable, and flexible. Substituted polyphosphazene polymers are readily prepared from poly(dichlorophosphazene) by substitution of the chlorine atoms on the backbone with the appropriate nucleophile, such as the sodium or lithium salt of phenol, aliphatic alcohol, or aromatic amine. Inorganic-organic hybrid polymers having an inorganic backbone and organic sidechains can be prepared through this approach. Hence, embodiments of the present invention include polyphosphazenes, but other polymers may also be used.

Electrode binders according to some examples of the present invention include a first polymer, preferably having a sidechain including an aromatic group, and at least one other component, the other component being for example a second polymer (such as an electron conducting polymer, a semiconducting polymer, or a polymer chosen to reduce the glass transition temperature of the electrode binder), an organometallic molecule, an acidic polymer, a free acid molecule, or some combination of these or other components. Examples of such possible additional components are described in more detail elsewhere in this specification.

In Int. Pat. Pub. No. WO 00/72395, Pintauro reported the use of sulfonated poly[bis-(phenoxy) phosphazene] as a proton exchange membrane (PEM) for a fuel cell. However, the use of polyphosphazenes in the electrode layers has not been previously suggested.

Fuel cells according to the present invention include proton-exchange membrane fuel cells (PEM-FCs). The PEM may comprise a proton-conducting polyphosphazene, such a sulfonated polyphosphazene, or any other proton-conducting polymer. A polyphosphazene-based PEM can form a stable laminate with electrodes that also contain a polyphosphazene-based binder. However, the PEM may be any proton-conducting material, and is not limited to phosphazene polymers.

Embodiments of the present invention include novel materials with one or more of the following properties: efficient oxygen transport (high oxygen permeability), proton conductivity, electron conductivity, and oxygen activation. These materials include chemically and thermally stable polymers with high free volume and low glass transition temperature (Tg), such as polyphosphazene-based materials, which are useful as improved electrolyte layers in fuel cell applications. In particular, such polymers are useful as cathode layer components for an improved PEM-FC.

Experimental

Polyphosphazenes with high oxygen permeability were used prepared, and used as an electrode binder in the cathode layer of a PEM FC. Improved oxygen permeability of the cathode layer of a PEM-FC increases the power density of the fuel cell.

The oxygen permeability, proton conductivity and chemical stability were evaluated for poly[(bisphenoxy)phosphazene], sulfonated poly[(bisphenoxy)phosphazene] (SBPP), poly[4-ethylphenoxy)(phenoxy)phosphazene] sulfonated poly[4-ethylphenoxy)(phenoxy)phosphazene] and weakly PBI doped (1-5%) sulfonated poly[(bisphenoxy) phosphazene] films.

Oxygen Permeability Measurements

Measurements were made using a Mocon OXTRAN® 2/20 apparatus (ASTM-D 3985-81). The instrument was calibrated at 23° C.-40° C. using NIST-certified Mylar films of known transport characteristics. Film specimens were masked with aluminum foil to have a circular exposure area of $5 \times 10^{-4}$ m$^2$. Films were either dried in a vacuum oven (0% RH measurements) or equilibrated in humidified N$_2$ gas at 50% RH before measurements. Oxygen was introduced into the upstream compartment (upstream gas was a mixture of 98% N$_2$ and 2% O$_2$) while the downstream gas was maintained at 98% N$_2$ and 2% H$_2$. Permeation tests were ended when the oxygen flux reached steady state (i.e., when the oxygen flux changed by less than 1% during a 20 minute time period). The steady-state oxygen flux was normalized by the membrane thickness to obtain the oxygen permeability, with units of (mol-cm)/(cm$^2$-s-kPa).

Sulfonation of Polymers

Sulfonation of poly[(bisphenoxy)phosphazene]: This was performed in two stages. First, the POP was dissolved in sulfuric acid at room temperature (1 hr.) and second, the solution was heated at 80° C. for a given period of time, between 90-130 min. The polymer was precipitated into ice, filtered, washed with DI water several times, treated with 0.05M NaOH solution and washed thoroughly with DI water. Finally sulfonated polyphosphazene (SPOP) product was dried at 60° C. The dry SPOP samples were dissolved in dimethylacetamide (DMAc) and cast into PTFE dishes. The solvent was evaporated at 80° C., the dry films were removed from the dishes, followed by a 1M sulfuric acid soak and repeated washings with DI water.

The water-equilibrated membranes were characterized (at room temperature, T=25° C.) with respect to ion-exchange capacity (equilibration in NaCl solution and titration of the supernatant solution with 0.01M NaOH), proton conductivity (in plane, two electrode cell), and water swelling (wet weight-dry weight)/dry weight]).

Sulfonation of poly[(4-ethylphenoxy)(phenoxy)phosphazene]: This was performed using concentrated sulfuric acid in two stages. First, P4EPPP was dispersed in sulfuric acid at room temperature for 1 hr. with vigorous stirring and then the suspension was heated to and maintained at 90° C. for a given period of time (between 4 and 8 hrs). The sulfonated polymer was precipitated by pouring the final solution over ice. After filtering and washing several times with DI water, the polymer was treated with 0.05M NaOH solution, washed a final time with DI water, and dried at 60° C. Five batches (1 g each) were sulfonated.

Experimental Data

The oxygen permeabilities of unsulfonated poly[(4-ethylphenoxy) (phenoxy)phosphazenes] were determined. The oxygen permeability was 4-8 times higher than that of the sulfonated bisphenoxy phosphazene and 5 times higher than that of the unsulfonated poly[(bisphenoxy)phosphazene]. The unsulfonated materials do not have significant proton conductivities. For PEM-FC applications, proton source groups such as acid groups may be attached to increase proton conductivity. Table 1 (below) shows results for 12 polyphosphazene film samples, each 2.0 g and sulfonated to a different ion exchange capacity (IEC).

TABLE 1

| | SYMBOL | | | | | |
|---|---|---|---|---|---|---|
| | T01 | T02 | T04 | T03 | T05 | T12 |
| SULF. TIME (min) | 105 | 90 | 99 | 108 | 119 | 130 |
| IEC (mmol/g) | 1.12 | 0.21 | 1.11 | 1.24 | 1.36 | 1.47 |
| CONDUCT. (S/cm) | 0.035 | 0.0001 | 0.027 | 0.032 | 0.057 | 0.071 |
| SWELLING (g/g) | 0.525 | 0.365 | 0.357 | 0.494 | 1.402 | 1.923 |

| | SYMBOL | | | | | |
|---|---|---|---|---|---|---|
| | T06 | T09 | T07 | T08 | T10 | T11 |
| SULF. TIME (min) | 95 | 99 | 105 | 110 | 110 | 120 |
| IEC (mmol/g) | 0.995 | 1.12 | 1.19 | 1.28 | 1.32 | 1.40 |
| CONDUCT. (S/cm) | 0.017 | 0.031 | 0.049 | 0.058 | 0.065 | 0.070 |
| SWELLING (g/g) | 0.374 | 0.448 | 0.560 | 0.782 | 0.942 | 1.427 |

The oxygen permeability of sulfonated poly[(4-ethylphenoxy) (phenoxy)phosphazene] and sulfonated poly[(bisphenoxy)phosphazene] (SPOP) are listed in Table 2. Some SPOP films were doped with polybenzimidazole (PBI). The oxygen permeability of SPOP and weakly PBI doped (1-5%) SPOP films at room temperature (25° C.) and 50% RH was in the range $4.10$-$9.78 \cdot 10^{-15}$ mol cm cm$^{-2}$s$^{-1}$kPa$^{-1}$.

TABLE 2

| | SPOP (Sulfonated Bisphenoxy) | | | | | | SPOP/PBI (PBI Doped) | | | POP | Ethylphenoxy/ Phenoxy Copolymer | |
|---|---|---|---|---|---|---|---|---|---|---|---|---|
| Ion-Exchange Capacity (mmol/g) | 1.3 | 1.4 | 1.4 | 1.8 | 1.9 | 1.9 | 1.8* 1% PBI | 1.8* 2% PBI | 1.9* 5% PBI | 0.0 | 0.0 40% EtPh | 0.0 70% EtPh |
| Oxygen Permeability ($10^{-15}$ mol cm cm$^{-2}$s$^{-1}$kPa$^{-1}$) | 5.6 | 6.0 | 5.7 | 9.8 | 5.9 | 4.4 | 4.1 | 6.6 | 6.3 | 7.2 | 36.5 | 38.3 |

The oxygen permeability is not a strong function of polymer ion exchange capacity. As the IEC increases, the polymer crystallinity decreases (which should promote higher oxygen transport rates) but the polymer glass transition temperature increases with IEC, which lowers oxygen permeability. The combination of these two effects is the reason why the permeability is essentially constant with IEC in Table 2. c At 50% RH, some polymer plasticization by water takes place, causing an increase in oxygen permeability. The oxygen permeability in a polymer with acidic functional groups is generally dependent on an interplay of several effects.

FIG. 1 shows proton conductivity measured for the SBPP samples equilibrated with humidified air at 60° C. (see FIG. 1). It was found to be comparable with other non-fluorinated materials. See J. Rozière and D. J. Jones, "Non-fluorinated Polymers Materials for Proton Exchange Membrane Fuel Cells", *Annu. Rev. Mater. Res.*, 33, 503-503 (2003).

The oxidative stability of SPOP and SPOP/PBI was superior, as compared to other non-fluorinated polymeric materials including sulfonated polysulfones, sulfonated poly(ether ketone), sulfonated poly(ether ether ketone), and sulfonated poly (phenyl quinoxaline). The oxidative stability of SPOP was determined using Fenton's reagent (3% hydrogen peroxide with 4 ppm ferrous ions at 60° C.). The weight loss of SPOP (IEC=0.995 mmol/g) after 40 hours was only 2 wt %.

Membranes were prepared by dissolving a dry sulfonated phosphazene polymer in dimethylacetamide (DMAc) and casting into PTFE dishes. The solvent was evaporated at 80° C. and the dry films were treated with 1M sulfuric acid and washed repeatedly with DI water. Proton conductivity at room temperature and oxygen permeability (50% RH) at both room temperature and at 40° C. were determined. DSC analyses of selected samples were also carried out. The properties of the sulfonated poly[(4-ethylphenoxy)(phenoxy)phosphazenes] are shown below in Table 3.

TABLE 3

| | Batch Symbol | | | | |
|---|---|---|---|---|---|
| | No. 2 | No. 3 | No. 4 | No. 5 | No. 6 |
| Sulf. Time (hour) | 5 h | 4 h | 6 h | 8 h | 7 h |
| Thickness (μm) | 125 | 50 | 125 | 108 | 160 |
| Conductivity (S/cm) | 0.036 | 0.001 | 0.054 | 0.072 | 0.061 |
| $O_2$ Perm at 23° C. (50% RH) | 9.68 | 10.4 | 12.1 | 11.1 | 11.8 |
| $O_2$ Perm at 40° C. (50% RH) | 23.4 | 26.8 | 28.9 | 23.5 | 22.8 |

Sulfonation of poly[(4-ethylphenoxy)(phenoxy)phosphazenes] (P4EPPP) was more difficult compared to that of poly[bis(phenoxy)phosphazene] (POP), and required a higher temperature (90° C. vs. 60-80° C.) and longer times (4-8 hrs vs. 2 hours for POP) to achieve a similar degree of sulfonation.

Figure 2:
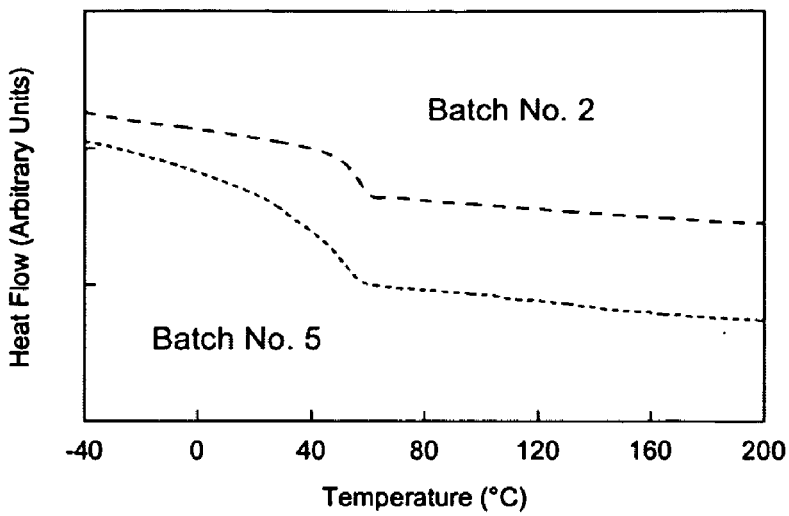
FIG. 2 shows DSC thermograms for two SP4EPPP polymers.

FIG. 2 shows DSC thermograms for two sulfonated poly [(4-ethylphenoxy)(phenoxy)phosphazenes] (SP4EPPP) polymers, batches 2 and 5 from Table 1. DSC scans revealed that all of the sulfonic acid polymers have glass transitions at temperature in the range 50-60° C. However, due to apparatus limitations, oxygen permeation was only determined at temperatures ≦40° C., below the glass transition temperatures. Gas permeability tends to increase with temperature in polymers, with typically a dramatic increase as the temperature increases through the glass transition temperature. Fuel cell operation, for example at 60° C. and 80° C., is above the Tg of SP4EPPP. Hence, it can be expected that the oxygen permeability of the polymer will be significantly higher than the values obtained at 23° C. and 40° C. Such a high oxygen permeability is advantageous for a cathode binder material.

Figure 3:
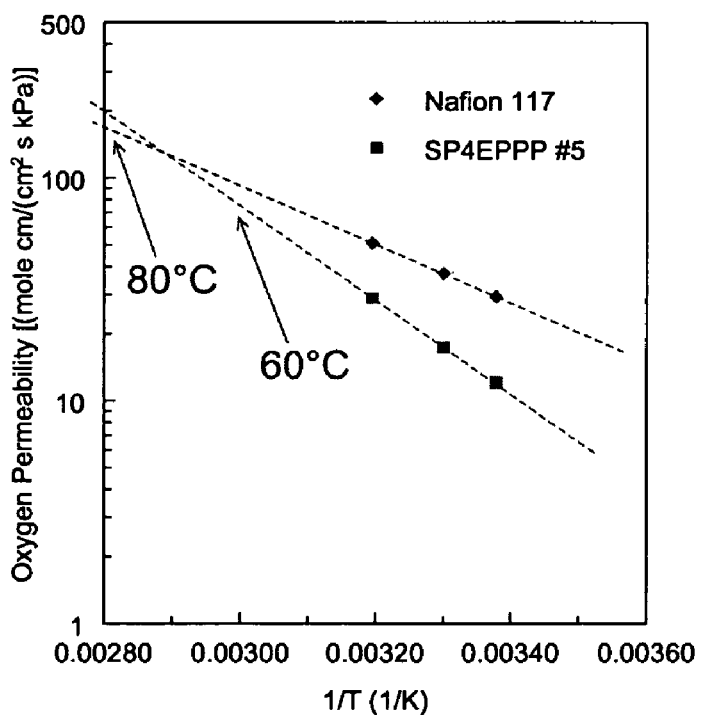
FIG. 3 shows an Arrhenius plot of oxygen permeability for SP4EPPP.

FIG. 3 shows an Arrhenius plot of $O_2$ permeability vs. 1/T for SP4EPPP (batch 4) and for Nafion 117. Assuming classical Arrhenius behavior, the extrapolated data suggests that the oxygen permeability of a SP4EPPP cathode binder will exceed that of Nafion™ for T>70° C. However, the oxygen permeability data was estimated using data collected below the glass transition temperature ($T_g$) of the SP4EPPP, hence an even higher oxygen permeability is expected for a typical fuel cell operating at 80° C.

This example shows that sulfonated poly[(4-ethylphenoxy)(phenoxy)phosphazene] can be used as a polymer electrode binder for the cathode in a $H_2$/air fuel cell. Membrane-electrode-assembly (MEA) fabrication and testing experiments were carried out using a Nafion 112 membrane, where the anode and cathode were hot pressed to the opposing surfaces of the Nafion™ film. The anode was prepared from carbon supported Pt and a Nafion™ electrode binder (0.4 mg/cm²), while cathodes were prepared from carbon supported Pt (0.4 mg/cm²) and the polyphosphazene electrode binder. The MEAs were tested in hydrogen/air fuel cell at 60° C. (where the anode humidifier was kept at 70° C. and the cathode humidifier was set at 60° C.).

Figure 4:
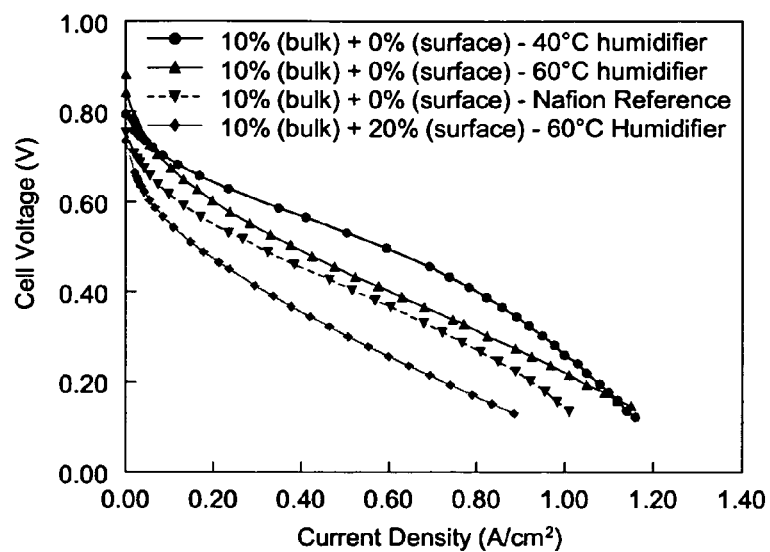
FIG. 4 shows the voltage/current density performance curves for MEAs with poly[(4-ethylphenoxy)(phenoxy)phosphazene] electrode binder (cathode only)
Figures 5A, 5B, 5C, 5D, 5E, 5F:
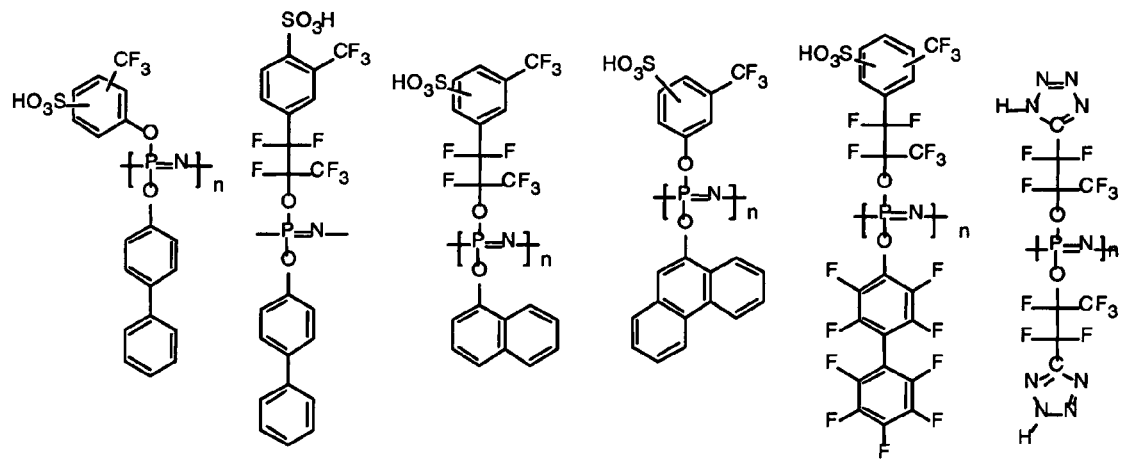
FIGS. 5A-5F and FIG. 6 show further representative polymers that can be used in gas-permeable materials according to the present invention.
Figure 6:
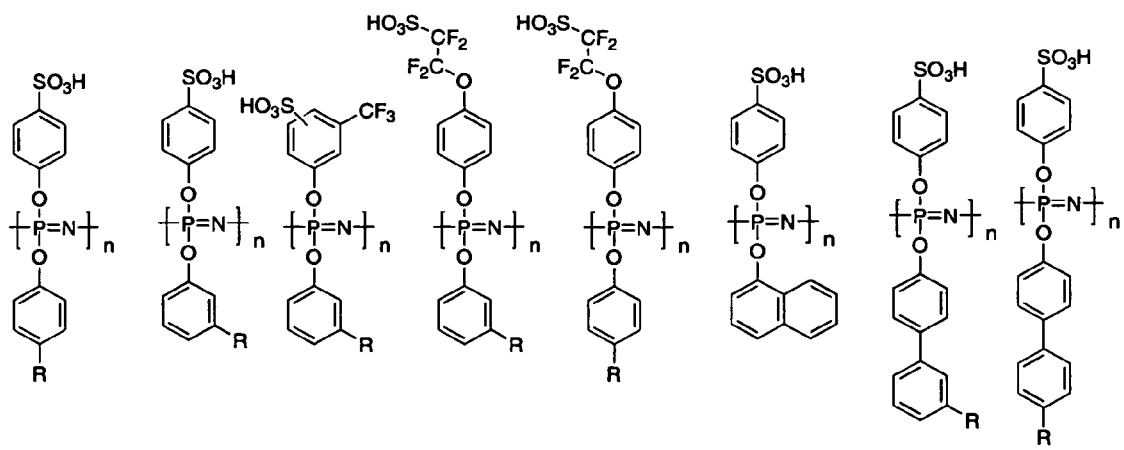

FIG. 4 shows the $H_2$/air fuel cell performance curves with a Nafion 112 membrane, sulfonated poly[(4-ethylphenoxy) (phenoxy)phosphazene] as the cathode binder and Nafion™ as the anode binder, with T=60° C. and ambient pressure air at 500 sccm. The results show that power can be generated in a hydrogen/air fuel cell when a sulfonated polyphosphazene is used as the cathode binder. A polyphosphazene can be used in a cathode binder and/or anode binder.

Ink Preparation

An ink including an improved electrode binder according to the present invention can be used for preparation of improved electrodes. An example ink comprises one or more catalytic metal precursors, a suspension medium, and an electrode binder according to an embodiment of the present invention. The electrode ink may be printed, bonded or coated onto the surface of a PEM, or located proximate to a PEM by any appropriate method.

A catalytic metal precursor may include (but is not limited to) one or more of the following metal atoms: Pt, Sn, Fe, Co, Cr, Ni, Nb, V, Mo, Mn, Pd, Ru, Rh, Zr, Ir, Rh, or other transition metal. The catalytic metal may be supported on carbon, and is preferably 5-70% by weight.

The suspension medium may comprise, for example, a hydrocarbon having ether, epoxy or ketone functionality and an alcohol which is not a solid at the processing temperature, preferably 40-95% weight medium, for example 1-methoxy-2 propanol.

The electrode binder may comprise a polymer according to an embodiment of the present invention, such as a polyphosphazene based electrode binder, for example, sulfonated poly [bis(3-methylphenoxy) phosphazene or sulfonated poly [(bisphenoxy)phosphazene]. The electrode binder may be present in the range 5-35% by weight.

Preparation of Cathode Electrode

In an example method of preparing a cathode electrode, a PtCo/C catalyst is ground up for 30 sec×6 times using a grinder in a glove box. The catalyst, distilled water, ethanol, glycerol and a 5% -35% sulfonated polyphosphazene are mixed in a glove box. The catalyst ink is stirred using an ultrasonic homogenizer, followed by stirring by a magnetic stirrer. The catalyst ink is cast on a TEFLON® sheet. The TEFLON® sheet, coated with the electrode paste, is dried in an atmosphere of argon gas at atmospheric pressure at 80-100° C., and the solvent removed under reduced pressure. Thus hot pressing is used to soften the membrane and embed a portion of the electrode into the membrane, and ensures adherence.

Other Polymers

FIGS. 5A-5F and FIG. 6 illustrate representative polymers that may be used in improved oxygen-permeable materials, such as electrode binders, according to embodiments of the present invention. Here, R=CF$_3$, CH$_3$, Et, other alkyl or fluoroalkyl groups. The examples are all polyphosphazenes, but other polymer backbones may be used.

These polymers have sidechains including substituted and/or unsubstituted aromatic rings. Polymers may be further modified by grafting additional moieties to increase free volume and to improve oxygen permeability. Sidechain groups may include one or more of the following: aromatic groups such as benzene, naphthalene, anthracene, phenanthrene, and their derivatives such as fluorinated and sulfonated groups; aromatic amines such as nitroaniline, acetanilide, and quinine and their derivatives such as fluorinated or sulfonated groups; aromatic nitro compounds, such as, 2,4-dinitrotoluene, and their derivatives such as fluorinated and sulfonated groups; aromatic carboxylic acids; and heteroaromatic compounds, such as pyridine, pyrrole, pyrylium salts, furan, thiophene, pyrimidine, imidazole, thiazole, triazole, tetrazole, isoquinoline, indole, and their derivatives such as fluorinated and sulfonated groups.

Materials, such as a polymer-based electrode binder, according to some embodiments of the present invention may further include organometallic molecules (or groups), which may be physically mixed or chemically bonded with a polymer, such as a polymer according to the present invention. Such organometallic molecules may include (but are not limited to) one or more of the following structures: simple metal-carbon σ-bond; multiple pπ-pπ bonds; and multiple dπ-pπ bonds. Metal atoms involved may include (but are not limited to) one or more of the following metals: Sc, Ti, V, Cr, Mn, Fe, Co, Ni, Cu, Zn, Zr, Nb, Mo, Ru, Rh, Pd, Ta, W, Re, Os, Ir, Pt, Au, or other transition metal. Ligands included in above organometallic molecules may include (but are not limited to) one or more of the following ligands: ligands which in the free state would be a radical (one unpaired electron) such as H, F, Br, NH$_2$, NR$_2$, PR$_2$, CN, N$_3$, NCS, monodentate carboxylates O$_2$CR, dithiocarbamates S$_2$CNR, amidates RC(NR)$_2$, alkyl, aryl, vinyl (alkenyl), acetylide (alkynyl), formyl, acyl, aroyl, and the like; ligands with in the free state would have an even number of valence electrons, such as OH$_2$, ether, amines, thioethers, phosphines, NR, O, S, PR, CO, CNR, CS, CR$_2$, C=CR$_2$, C=C=R$_2$, O$_2$, SO$_2$, CS$_2$, CSe$_2$, PR=PR, R$_2$Si=CR$_2$ etc.; ligands which can be subdivided into a combination of 1EV (valence electron) and 2EV, such as η$^3$-allyl, η$^3$-cyclopropenyl, didentate alkenyls, acyls, carboylates, dithiocarbamates, amidates, β-diketonates, salicylates, glyoximates; dienes including cyclobutadiene and heteroatom-substituted dienes such as vinyl ketones; cyclopentadienyl, pentadienyl, tris(pyrazolyl)borate; arenas, trienes, thiophene, pyrrole; η$^7$-cyclohexatrienyl; η$^8$-cyclooctatetraene and η''-C$_n$R$_x$.

Materials, such as a polymer-based electrode binder, according to some embodiments of the present invention may further include electron conducting or semiconducting polymers. Such electron conducting or semiconducting polymers can be physically mixed or doped into the polymer or chemically bonded to a polymer matrix through cross-linking or other chemical reactions. Conducting polymers in an electrode binder may contribute to the improvements of electron conductivity, oxygen activation, and oxygen transportation between the surfaces of the electrocatalyst and the electron (current) collector. A conducting polymer may include a π-conjugated network, such as (but not limited to) one or more of the following polymers: trans-polyacetylene, cis-polyacetylene, polythiophene, polypyrrole, polyaniline, and derivatives thereof. Conducting polymers may be doped. A semi-conducting polymer may include a π-conjugated network, and may include (but is not limited to) one or more of the following doped polymers: poly(para-phenylene), poly(para-pyridine), poly(para-phenylene vinylene), poly(para-pyridyl vinylene), poly(para-pyridyl vinylene phenylene vinylene), "strapped" poly(para-pyridyl vinylene phenylene vinylene), poly(fluorene) and their derivatives. A semiconducting polymer may also be a non-conjugated semi-conducting polymers, such as poly(vinylcarbazole) and its derivatives.

Electrode binders may include polymer and/or non-polymer compounds having one or more acid groups (such as —SO$_3$H, —PO$_3$H$_2$, carboxylic acid groups), including halogenated acid-containing groups such as —SO$_2$NHSO$_2$CF$_3$, and —CF$_2$SO$_2$NHSO$_2$CF$_3$, and the like, for example to enhance proton conductivity.

Cross-Linking

To provide increased proton conductivity of a binder at low relative humidity, polyphosphazene with a low equivalent weight (EW) may be used. The hydrophilicity of such a material can be balanced by hydrophobic co-substituent groups, and by crosslinking the polymer chains. However, crosslinking may decrease the free volume of the polymer and therefore decrease its oxygen permeability. Crosslinking based on a Diels Alder reaction between a terminal alkyne and substituted cyclopentadiene may be used, or an azide/alkyne reaction. In an example according to the present invention, a first polymer is provided with one or more terminal alkyne groups, and a second polymer is provided with one or more substituted cyclopentadiene groups, and a cross-linked network is formed by heating. The first and second polymers may be the same or different.

Applications

Applications of gas-permeable materials according to the present invention include improved fuel cells, such as hydrogen fuel cells, direct methanol fuel cells, and other fuel cells, including fuel cells based on another cation species such as alkali metals. Other applications include other electrochemical devices, electrochromic devices, gas separation and purification, gas-permeable membranes, other industrial gas processing, sensors, and other energy generating devices.

Patents, patent applications, or publications mentioned in this specification are incorporated herein by reference. In particular, U.S. Prov. Pat. App. Ser. No. 60/666,276, filed Mar. 29, 2005 is incorporated herein in its entirety.

The invention is not restricted to the illustrative examples described above. Examples are not intended as limitations on the scope of the invention. Methods, apparatus, compositions, and the like described herein are exemplary and not intended as limitations on the scope of the invention. Changes therein and other uses will occur to those skilled in the art. The scope of the invention is defined by the scope of the claims.

Having described our invention, we claim:

The invention claimed is:

1. A membrane electrode assembly for a fuel cell, the membrane electrode assembly comprising:
   a first electrode including a catalyst and an electrode binder, the electrode binder comprising a polyphosphazene,
   the polyphosphazene including an acid group,
   the acid group being a sulfonic acid group, a phosphonic acid group, an aromatic carboxylic acid group, or a sulfonamide acid group;

a second electrode; and an electrolyte, located between the first electrode and the second electrode.

2. The membrane electrode assembly of claim 1, wherein the first electrode is a cathode, the electrode binder is a cathode binder, and the second electrode is an anode.

3. The membrane of claim 2, wherein the anode comprises an anode binder, the anode binder comprising a second polyphosphazene.

4. The membrane electrode assembly of claim 1, wherein the polyphosphazene is a sulfonated polyphosphazene.

5. The membrane electrode assembly of claim 4, where the sulfonated polyphosphazene is sulfonated poly[(4-ethylphenoxy)(phenoxy)phosphazene].

6. The membrane electrode assembly of claim 1, wherein the acid group is a phosphonic acid group.

7. The membrane electrode assembly of claim 1, wherein the acid group is a sulfonamide acid group.

8. The membrane electrode assembly of claim 1, wherein the polyphosphazene includes a sidechain, the sidechain including an aromatic group.

9. The membrane electrode assembly of claim 8, wherein the aromatic group has an alkyl substituent with between 1 and 5 carbon atoms.

10. The membrane electrode assembly of claim wherein the polyphosphazene is cross-linked.

11. The membrane electrode assembly of claim 1, wherein the electrode binder comprises the polyphosphazene and at least one other polymer.

12. The membrane electrode assembly of claim 11, wherein the at least one other polymer includes a polybenzimidazole.

13. The membrane electrode assembly of claim 11, wherein the at least one other polymer includes a second polyphosphazene.

14. The membrane electrode assembly of claim 1, wherein the polyphosphazene has a polymer backbone, a first sidechain, and a second sidechain, the first sidechain including an aromatic group, the second sidechain including the acid group.

15. The membrane electrode assembly of claim 1, the acid group being a halogenated sulfonamide acid group.

* * * * *